June 26, 1923.
A. V. WANGENHEIM
VALVE
Filed Feb. 27, 1922
1,459,809
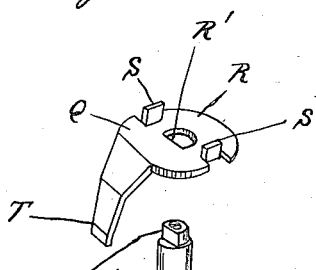
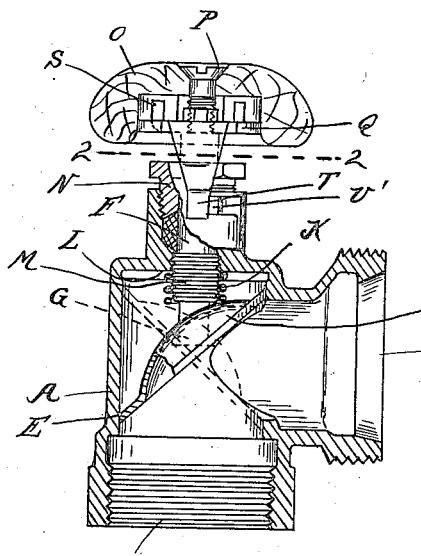
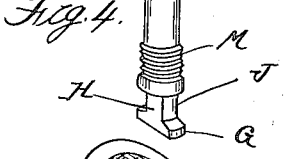
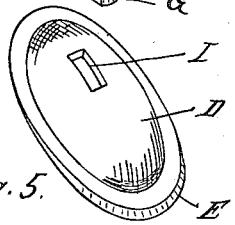
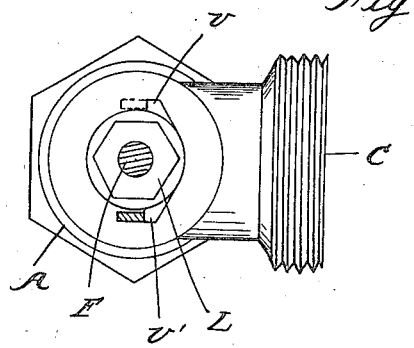
Inventor
Adolph V. Wangenheim
Attorney Patented June 26, 1923.

1,459,809

UNITED STATES PATENT OFFICE.

ADOLPH V. WANGENHEIM, OF DETROIT, MICHIGAN, ASSIGNOR TO DETROIT LUBRICATOR COMPANY, OF DETROIT, MICHIGAN, A CORPORATION OF MICHIGAN.

VALVE.

Application filed February 27, 1922. Serial No. 539,437.

*To all whom it may concern:*

Be it known that I, ADOLPH V. WANGENHEIM, a citizen of the United States of America, residing at Detroit, in the county of Wayne and State of Michigan, have invented certain new and useful Improvements in Valves, of which the following is a specification, reference being had therein to the accompanying drawings.

The invention relates to valves, being more particularly applicable to construction in which the inlet and outlet are in angular relation to each other. It is the object of the invention to simplify the construction to diminish the resistance to the flow of fluid when the valve is in open position to facilitate the assembly of the parts and to otherwise improve the construction. The invention therefore consists in the peculiar construction as hereinafter set forth.

In the drawings:

Figure 1 is a central longitudinal section through the valve;

Figure 2 is a sectional plan view on line 2—2 of Figure 1;

Figures 3, 4 and 5 are perspective views of the several parts of the valve detached.

A is the valve casing which is of substantially cylindrical form and as shown has its inlet and outlet openings B and C at right angles to each other. D is a disk of elliptical form, having its periphery E oblique to the plane of the disk so as to fit within the cylindrical body of the casing when arranged obliquely therein. The disk is preferably dished or concaved so as to enlarge the cross-sectional area in the open position of the valve and also to form a curved surface which diminishes the frictional resistance to the fluid in turning the bend. F is a stem for rotating the disk D, this being provided with the head portion G with parallel sides H. The head is insertable through an aperture I in the disk, which aperture is of sufficient length to permit the passage of the head when the stem is substantially perpendicular to the plane of the disk. Adjacent to the head the stem is provided with a reduced neck J, which, when the stem is turned at an angle to the disk, will completely fill the aperture I, the shoulder of the head preventing disengagement of the disk. K is a spring which is sleeved on the stem and one end of which abuts against the disk while the opposite end abuts against a head L forming the end of the casing. The stem has a threaded portion M engaging a corresponding threaded aperture in the head L and a packing gland N is engaged with the stem beyond the threaded socket. O is a handle secured to the outer end of the stem by means of the screw P and Q is a combined stop and indicator which is clamped between the end of the stem and the handle. This stop has a disk portion R with inwardly struck prongs S for engaging recesses in the handle and with a depending finger or index T adapted to engage lugs U and U' on opposite sides of the casing to limit the turning movement.

In assembling the parts, the stem F with the spring K sleeved thereon, has its head G inserted through the aperture I of the disk, and the stem and disk are then turned in an oblique relation and inserted within the casing A with the stem passing through the aperture in the head L. The stem is then revolved to engage the threaded portion M with the threaded socket in the casing and is turned a sufficient distance to adjust the disk into proper registration. The packing gland N is then engaged with the stem, after which the member Q is engaged with the end of the stem and held from rotation by the flattened portion R' engaging the flattened face F'. The handle is then secured to the stem, retaining the member Q in position.

In operation, the turning of the stem will effect a rotation of the disk from the open position shown in full lines to the closed position indicated in dotted lines. In the latter the disk lies across the path of the current from the inlet to the outlet of the casing and the oblique peripheral edge forms a substantially fluid tight seal. One important advantage of the construction is the limiting area of bearing of the disk upon the valve casing. This reduces the resistance to turning, which is occasioned by the adhesion between the valve and the case where there is a large area of contact. Also, the disk forms in effect a scraper which will remove any deposit upon the surface of the casing that might otherwise tend to interfere with the turning of the valve. Another advantage is the slight obstruction that is placed in the path of the current when the valve is open and the easy bend around which the fluid is turned. The stop Q is exactly positioned with reference to the stem and to the disk so as to arrest movement when the valve is in fully closed or fully open positions and the finger Q forms an indicator in connection with suitable markings adjacent to the stop lugs U and U'.

Mechanically the construction is exceedingly simple and, as above described, may be easily assembled.

What I claim as my invention is:

1. The combination with a casing having inlet and outlet openings and a cylindrical portion intermediate the same, of a disk valve arranged obliquely across the cylindrical casing in peripheral sealing contact therewith, and means for rotating said disk from a position for obstructing the flow of fluid through said casing to a position permitting such flow.

2. The combination with a casing having inlet and outlet openings and a cylindrical portion intermediate the same, of a disk valve arranged obliquely across said cylindrical portion in peripheral sealing contact therewith, said disks being rotatable in said cylindrical portion from a position from obstructing the flow of fluid through said casing to a position permitting said flow, a rotatable stem extending obliquely from said disk and connected thereto, and a handle for operating said stem.

3. The combination with a casing having inlet and outlet openings and a cylindrical portion therebetween, of a disk extending obliquely across said cylindrical portion for peripheral sealing contact therewith, said disks being rotatable in said cylindrical portion from a position from obstructing the flow of fluid through said casing to a position permitting said flow, a stem non-rotatively engageable with said disk and extending obliquely therefrom through an aperture in said casing, means for rotating said stem, and a stop for limiting the rotation of said stem in the closed position of said valve.

4. The combination with a casing having inlet and outlet apertures at an angle to each other and a cylindrical portion intermediate said apertures, of a disk arranged obliquely across said cylindrical portion and being dished or concaved to form a rounded bend between said inlet and outlet in one position of adjustment, said disks being rotatable in said cylindrical portion from a position from obstructing the flow of fluid through said casing to a position permitting said flow, and a stem extending obliquely from said disk through an aperture in the casing forming a means for rotating the same.

5. The combination with a casing having inlet and outlet apertures at an angle to each other and a cylindrical portion intermediate the same, of a disk of elliptical form arranged obliquely across said cylindrical portion and having bevelled edges for fitting the cylindrical surface, said disk being dished or concaved to form a rounded bend between said inlet and outlet in one position of adjustment, a stem having a flattened head engaging a correspondingly shaped aperture in said disk, said stem passing outward through an aperture in said casing, and a handle for rotating said stem.

6. The combination with a casing having inlet and outlet apertures at an angle to each other and a cylindrical portion intermediate the same, of a disk arranged obliquely across said cylindrical portion and having a bevelled periphery for fitting against the cylindrical surface, a stem for rotating said disk having a flattened end portion including a head and a neck of reduced diameter, said head being insertable through an aperture in said disk when arranged substantially perpendicular to the plane of the disk, said reduced neck filling said aperture when the stem is turned into oblique relation to the disk and with its axis coincident with the axis of said cylinder.

7. The combination with a casing having inlet and outlet apertures at an angle to each other and a cylindrical portion intermediate the same, of a disk extending obliquely across said cylindrical portion in peripheral sealing contact therewith, said disks being rotatable in said cylindrical portion from a position from obstructing the flow of fluid through said casing to a position permitting said flow, a stem non-rotatively engaging said disk and passing outward through an aperture in said casing, a handle for engaging said stem, a finger engaging said stem and handle and extending outside said casing, and a stop cooperating with said finger to limit the rotative movement of said valve.

8. The combination with a casing having inlet and outlet apertures and a cylindrical portion therebetween, of a disk extending obliquely across said cylindrical portion in peripheral sealing contact therewith, a stem for rotating said disk having a flattened end portion including a head and a reduced neck, and having a threaded portion adjacent thereto for engaging a threaded socket in said casing, said disk having an aperture for the passage of said flattened head when arranged substantially perpendicular to the plane of the disk and said neck filling said aperture when the stem is arranged obliquely to the plane of the disk, and a spring sleeved upon said stem having its opposite end bearing respectively against said disk and said casing to hold the former in contact with the cylindrical walls.

In testimony whereof I affix my signature.

ADOLPH V. WANGENHEIM.